Nov. 18, 1969   R. B. WALLACE   3,478,800
THREADED FASTENER WITH FRICTION LOCK INSERT
Filed March 4, 1968
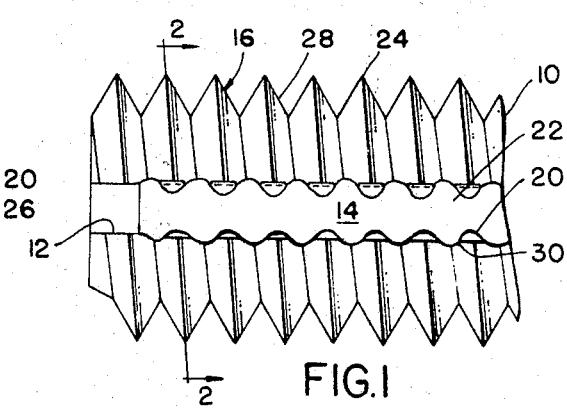
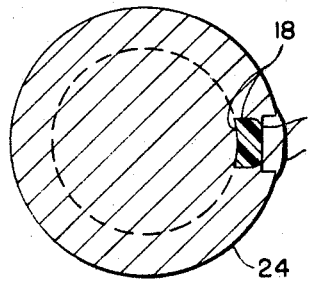
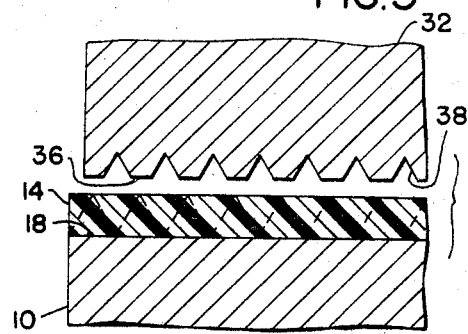
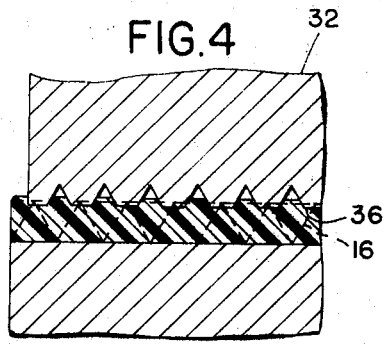
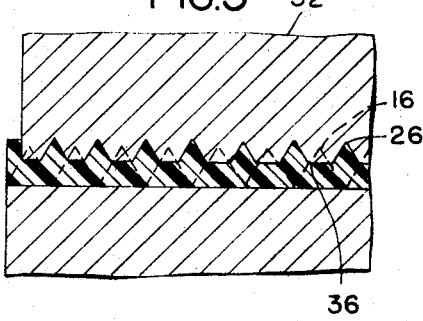
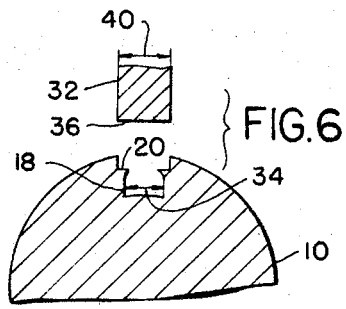
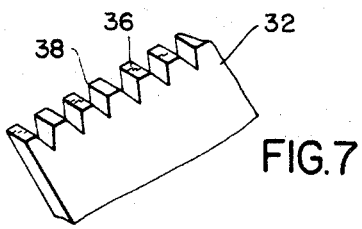
*INVENTOR*
RICHARD B. WALLACE
BY Whittemore, Hulbert & Belknap
*ATTORNEYS*

United States Patent Office 3,478,800
Patented Nov. 18, 1969

3,478,800
THREADED FASTENER WITH FRICTION LOCK INSERT
Richard B. Wallace, Bloomfield Hills, Mich., assignor to The Oakland Corporation, Troy, Mich., a corporation of Michigan
Filed Mar. 4, 1968, Ser. No. 710,179
Int. Cl. F16b 39/24; B23g 9/00
U.S. Cl. 151—7     6 Claims

ABSTRACT OF THE DISCLOSURE

A friction strip is inserted in a recess extending longitudinally of a threaded member and areas in line with pairs of thread ends are depressed inwardly while barbs are sheared downwardly from the crests of the ends of the thread at the sides of the recess to overlie and lock the inserts in place while providing for radially outward and circumferential displacement of plastic material intermediate pairs of thread ends.

FIELD OF THE INVENTION

Friction lock inserts have been provided in recesses extended longitudinally of threaded parts such as bolts or screws, and they have been locked in place by barbs or projections sheared downwardly from the crests of the ends of the thread form at the sides of the recess. This shearing operation has however, been performed with a simple blade which displaces the insert material circumferentially from the recess and does not permit it to be displaced radially outwardly within the recess. The result of this is lateral flow of the plastic insert through the thread valley and presents the danger that these portions of the insert have been nearly detached from the main body of the insert even before the product is used.

Another practice which has been used is to first form the barbs and thereafter insert the plastic with a blade having a mating thread form.

SUMMARY OF THE INVENTION

In accordance with the present invention the plastic material is first placed in the elongated recess in the threaded member, after which a special tool is applied having shearing portions separated axially of the blade so as to shear downwardly the material from the crests of the ends of the thread at the sides of the recess. The blade intermediate these shearing portions is of generally thread form and is recessed outwardly of the threaded part to provide a space intermediate the longitudinally adjacent thread ends into which the plastic material may undergo plastic flowing so as to flow outwardly to the desired point. This radially outward flow of plastic material may be a few thousandths of an inch above the crests of the thread of the threaded member. At the same time, the formation of the barbs by the shearing action retains the entire insert in position.

It is accordingly an object of the present invention to provide a threaded member having a longitudinally extending recess occupied by an insert, the portions of the insert intermediate aligned thread ends being displaced downwardly and locked in the recess by barbs, the material of the insert occupying the extension of the thread valley being displaced both radially outwardly to a point which may be outward from the crests of the threads, and to a degree circumferentially in the thread valley from the recess.

It is a further object of the present invention to provide a tool for producing the threaded member as described in the preceding paragraph, the member being in the form of an elongated punch having shearing sections provided to engage the thread ends at the sides of the recess, and relieved zones intermediate the shearing zones to permit radially outward as well as circumferential flow of plastic material.

It is a further object of the present invention to provide a method of making a threaded member as described in the foregoing, which comprises applying pressure to portions of a plastic strip located in a recess extending longitudinally of a threaded member, simultaneously shearing material from the crests of the thread ends at the sides of the recess downwardly to form inwardly projecting barbs to retain the plastic material in place while providing for radially outward as well as circumferential flow of material displaced downwardly by the aforesaid application of pressure.

Other objects and features of the invention will become apparent as the description proceeds, especially when taken in conjunction with the accompanying drawings, illustrating preferred embodiments of the invention.

BRIEF DESCRIPTION OF THE DRAWING

FIGURE 1 is an elevational view of the threaded end of a threaded member having a plastic insert therein.

FIGURE 2 is a sectional view on the line 2—2, FIGURE 1.

FIGURES 3, 4 and 5 are diagrammatic views showing successive steps in the operation of displacing and locking the plastic material in the recess.

FIGURE 6 is a view illustrating the manner in which the blade shears material and forms barbs at opposite sides of the recess.

FIGURE 7 is a fragmentary perspective view of the forming tool.

DESCRIPTION OF THE PREFERRED EMBODIMENTS

Referring first to FIGURES 1 and 2 there is shown a threaded member 10 having an elongated recess 12 extending longitudinally of the threaded member from the threaded end thereof. Located within the recess 12 is a plastic strip 14 which in the zone between aligned ends of the thread 16 at opposite sides of the recess 12 is formed downwardly to the zone indicated in section at 18 in FIGURE 2, this material being retained in place by laterally inwardly projecting barbs 20. As will subsequently appear, the formation of the barbs results in displacement of the plastic material from the zone determined by transversely aligned thread ends, this displacement resulting in a radially outward flow into zones indicated at 22, the displacement being radially outwardly from the crests 24 of the threads 16 as indicated at 26 in FIGURE 2. This flow of the plastic material also takes place circumferentially of the thread grooves 28 and this circumferential extension or displacement of the plastic material is indicated at 30 in FIGURE 1.

Referring now to FIGURES 6 and 7 there is illustrated a tool or blade 32 for producing the structure shown in FIGURES 1 and 2. The threaded member is shown in FIGURE 6 at 10 and the initially provided groove has a width as indicated by the dimension 34. The tool 32 has generally planar shearing surfaces 36 separated by transverse grooves or spaces 38, each of the shearing surfaces being designed to be aligned with a pair of thread ends confronting each other across the recess 18. Inasmuch as the threads are either right or left hand, it will be appreciated that for exact registration with a pair of aligned thread ends, the planar areas 36 will be in the form of parallelograms having sides which extend at the opposite angle to the thread of the threaded part 10.

The tool or blade 32 has a dimension indicated at 40 somewhat wider than the initial width of the recess 18 so that when the blade is moved downwardly from the position shown in FIGURE 6, it shears material from the confronting crests of the threads and forms the barbs 20 previously described. At the same time the flat surfaces of the planar areas 36 displace the plastic material radially inwardly in the zone of the barbs and causes it to undergo plastic flow from beneath the surfaces 36. This plastic flow is permitted to result in a radially outward flow of the plastic material due to the registration of the transverse grooves 38 in the tool. Also, the plastic material is of course permitted to flow circumferentially in a threaded groove in the manner best illustrated in FIGURE 1.

Referring now to FIGURES 3, 4 and 5 there is shown a sequence of steps in which the plastic material is first inserted in the groove or recess 18 in the threaded part 10. This condition is illustrated in FIGURE 3 where it will be observed that the thickness of the plastic strip 14 may be equal to the depth of the recess 18. The actual thickness of the plastic strip is of course variable in accordance with the final desired form and the amount of displacement accompanying the formation of the barbs 20. In some cases the plastic strip may be substantially thinner than as illustrated in FIGURE 3.

In FIGURE 4 it will be observed that the tool 32 has been moved downwardly so that each of its planar areas 36 has engaged the crests of the ends of the threads 16 and has initiated a shearing action, and at the same time, a displacement of the plastic material from beneath the planar areas 36 of the tool 32. The operation is continued as illustrated in FIGURE 5 where the planar areas 36 are shown as substantially below the crests of the thread 16 resulting in substantial flow of material, as indicated at 26, which may extend above the crests of the thread 16 as illustrated. This results in a construction in which the plastic strip is firmly retained or clinched in place while at the same time the displaced portions thereof are in position to effect a frictional interlock with a mating threaded element.

Since the formation of the barbs 20 results from a shearing action performed by a tool having a flat undersurface 36, it will be appreciated that the barbs, as clearly illustrated in FIGURE 1, do not extend laterally beyond the sides of the threads and accordingly, do not produce metal-to-metal interference with the mating part. Moreover, it will be observed that since the barbs are located a substantial distance inwardly from the crests of the threads, there will be a corresponding inward displacement of the radially outer surface of the portions of the strip intermediate confronting front ends and a correspondingly greater displacement of friction material into the thread valleys and radially outwardly in the thread valleys.

The drawing and the foregoing specification constitute a description of the improved method and apparatus for applying strip type plastic inserts and product resulting therefrom, in such full, clear, concise and exact terms as to enable any person skilled in the art to practice the invention.

What I claim as my invention is:

1. An elongated threaded member having an elongated recess extending longitudinally at one side thereof, an integral elongated strip of friction material in said recess, the portions of said strip in line with confronting pairs of thread ends at opposite sides of said recess extending from the bottom of the recess radially outwardly to points spaced substantially inwardly from the thread crests, the ends of said threads forming the sides of said recess being sheared inwardly a substantial distance from the thread crests to form projections located substantially below the thread crests and overlying the portion of said strip intermediate each confronting pair of thread ends to lock the strip in said recess and retain the material of the portion of the strip intermediate each confronting pair of thread ends substantially below the crests of the threads, the portions of the strip in line with confronting pairs of thread valleys at opposite sides of said recess extending radially outwardly of said recess substantially beyond the portions of said strip in line with confronting pairs of thread ends.

2. A member as defined in claim 1 in which the portions of said strip intermediate confronting pairs of thread valleys extend radially outwardly to the crests of the threads on said member.

3. A member as defined in claim 1 in which the portions of said strip intermediate confronting pairs of thread valleys extend radially outwardly to a point outwardly of the crests of the threads on said member.

4. A member as defined in claim 1 in which the portions of said strip intermediate confronting pairs of thread valleys extend radially outwardly to the crests of the threads on said member and extend circumferentially into the thread valleys from said recess.

5. A member as defined in claim 1 in which said friction material is a deformable plastic material.

6. A member as defined in claim 1 in which the projections formed from the material sheared from the crests of the confronting thread ends at the recess being located entirely between the projected side surfaces of the thread so as to avoid metal-to-metal interference with a mating threaded member.

References Cited

UNITED STATES PATENTS

| 3,173,466 | 3/1965 | Starriett et al. | 151—7 |
| 3,182,702 | 5/1965 | Nason et al. | 151—7 |
| 3,263,726 | 8/1966 | McKay | 151—7 |
| 3,324,919 | 6/1967 | Brightman et al. | 151—7 |

FOREIGN PATENTS

| 662,863 | 12/1951 | Great Britain. |

RAMON S. BRITTS, Primary Examiner

U.S. Cl. X.R.

10—10